US008364607B2

(12) United States Patent
Perry

(10) Patent No.: US 8,364,607 B2
(45) Date of Patent: Jan. 29, 2013

(54) SHIPMENT FLOW VALIDATION SYSTEMS AND METHODS

(75) Inventor: Andy Logan Perry, Raleigh, NC (US)

(73) Assignee: United Parcel Service of America, Inc.

( * ) Notice: Subject to any disclaimer, the term of this patent is extended or adjusted under 35 U.S.C. 154(b) by 371 days.

(21) Appl. No.: 12/544,020

(22) Filed: Aug. 19, 2009

(65) Prior Publication Data

US 2011/0047000 A1 Feb. 24, 2011

(51) Int. Cl.
G06Q 30/00 (2012.01)
G06Q 10/00 (2012.01)
(52) U.S. Cl. ...................................................... 705/338
(58) Field of Classification Search ................... 705/1.1, 705/7.11, 7.12, 7.13, 7.23, 7.36, 7.37–7.39, 705/323, 330–341, 348, 400, 417, 418; 703/2, 703/6
See application file for complete search history.

(56) References Cited

U.S. PATENT DOCUMENTS

| | | | |
|---|---|---|---|
| 4,972,318 A | 11/1990 | Brown et al. | |
| 5,712,989 A | 1/1998 | Johnson et al. | |
| 6,505,094 B2 | 1/2003 | Pape et al. | |
| 6,795,823 B1 | 9/2004 | Aklepi et al. | |
| 6,965,868 B1 | 11/2005 | Bednarek | |
| 6,985,871 B2 | 1/2006 | Simon et al. | |
| 7,136,830 B1 | 11/2006 | Kuelbs et al. | |
| 7,212,976 B2 | 5/2007 | Scheer | |
| 7,324,966 B2 | 1/2008 | Scheer | |
| 7,684,994 B2 * | 3/2010 | Kodger, Jr. | 705/333 |
| 7,979,359 B1 * | 7/2011 | Young et al. | 705/332 |
| 2002/0019759 A1 * | 2/2002 | Arunapuram et al. | 705/7 |
| 2002/0194038 A1 * | 12/2002 | Sauser et al. | 705/5 |
| 2003/0060924 A1 * | 3/2003 | Ye et al. | 700/217 |
| 2004/0073448 A1 | 4/2004 | Barts et al. | |
| 2005/0027660 A1 * | 2/2005 | Leroux et al. | 705/400 |
| 2005/0125247 A1 * | 6/2005 | Ding et al. | 705/1 |

(Continued)

FOREIGN PATENT DOCUMENTS

JP 2006347690 A * 12/2006

OTHER PUBLICATIONS

Taha, Tarek T. et al., A Simulation-Based Software System for Evaluating Hub-and-Spoke Transportation Networks, Mar. 1995, Elsevier Science, pp. 327-346.*

(Continued)

*Primary Examiner* — Igor Borissov
(74) *Attorney, Agent, or Firm* — Alston & Bird LLP

(57) ABSTRACT

According to various embodiments, a flow validation system models distribution flows of a consignor's packages from each of one or more hubs within a carrier's shipping network. The flow validation system allows the carrier and/or the consignor to identify at least one optimal hub within the carrier's shipping network to which packages destined for a particular geographical area (e.g., three-digit ZIP code) should be shipped from their origin and from which the packages should be distributed through the carrier's general shipping network to their respective destinations. According to various embodiments, the optimal hub (or hubs) for packages destined for a particular geographical area may be identified based on the number of days expected to transport the packages from the origin to the particular geographical area via the optimal hub (least "time-in-transit") and/or the distance (or range of distances) between the optimal hub and the particular geographical area.

22 Claims, 10 Drawing Sheets

U.S. PATENT DOCUMENTS

| | | | |
|---|---|---|---|
| 2005/0256731 A1* | 11/2005 | Mougey et al. | 705/1 |
| 2005/0288986 A1 | 12/2005 | Barts et al. | |
| 2006/0136237 A1* | 6/2006 | Spiegel et al. | 705/1 |
| 2007/0276685 A1 | 11/2007 | Raupers et al. | |
| 2009/0037348 A1* | 2/2009 | Joshi et al. | 705/400 |
| 2010/0250384 A1* | 9/2010 | Bhargava | 705/26 |
| 2010/0274609 A1* | 10/2010 | Shoemaker et al. | 705/8 |
| 2010/0312715 A1* | 12/2010 | Esque et al. | 705/330 |
| 2011/0029446 A1* | 2/2011 | Benda et al. | 705/330 |
| 2011/0161241 A1* | 6/2011 | Jani et al. | 705/338 |
| 2011/0231335 A1* | 9/2011 | Kocis et al. | 705/338 |

OTHER PUBLICATIONS

Caputo, A.C., FratocchiL, and Pelagagge, P.M., "A Framework for analysing long-range direct shipping logistics"; Industrial Management & Data Systems, vol. 105, No. 7, 2005; pp. 876-899; www.emeraldinsight.com/0263-5577.htm.

Chong, Libby, Kennedy, Damian and Chan, Weng Meng; "Direct shipping logistic planning for a hub-and-spoke network with given discrete intershipment times"; International Transactions in Operational Research; 13 (2006) pp. 17-32.

* cited by examiner

FIG. 10

| Sort By: | State | 3 Digit Zip | Avg Daily Pkgs | Current Flow | Proposed Flow | Ontca 1TNT | Mestx 2TNT | Cchil 3TNT | Denco 4TNT | Wilpa 5TNT | Meanj 6TNT | Jacfl 7TNT | Plega 8TNT | Nbaca 9TNT | Ontca 1Zone | Mestx 2Zone | Cchil 3Zone | Denco 4Zone | Wilpa 5Zone | Meanj 6Zone | Jacfl 7Zone | Plega 8Zone | Nbaca 9Zone |
|---|---|---|---|---|---|---|---|---|---|---|---|---|---|---|---|---|---|---|---|---|---|---|---|
| | | | | | | | | | Includes Line-Haul Day(s) | | | | | | 710 | | | | | | | | 715 |
| Options | WA | 980 | 160.05 | Nbaca | Ontca Nbaca | 3 | 6 | 6 | 4 | 8 | 8 | 8 | 8 | 3 | 5 | 7 | 7 | 6 | 8 | 8 | 8 | 8 | 5 |
| Options | WA | 981 | 88.65 | Nbaca | Ontca Nbaca | 3 | 6 | 6 | 4 | 8 | 8 | 8 | 8 | 3 | 5 | 7 | 7 | 6 | 8 | 8 | 8 | 8 | 5 |
| Options | WA | 982 | 104.05 | Nbaca | Ontca Nbaca | 3 | 6 | 6 | 4 | 8 | 8 | 8 | 8 | 3 | 5 | 7 | 7 | 6 | 8 | 8 | 8 | 8 | 5 |
| Options | WA | 983 | 94.3 | Nbaca | Ontca Nbaca | 3 | 6 | 6 | 4 | 8 | 8 | 8 | 8 | 3 | 5 | 7 | 7 | 5 | 8 | 8 | 8 | 8 | 5 |
| Options | WA | 984 | 56.05 | Nbaca | Ontca Nbaca | 3 | 6 | 6 | 4 | 8 | 8 | 8 | 8 | 3 | 5 | 7 | 7 | 5 | 8 | 8 | 8 | 8 | 5 |
| Options | WA | 985 | 74.55 | Nbaca | Ontca Nbaca | 3 | 6 | 6 | 4 | 8 | 8 | 8 | 8 | 3 | 5 | 7 | 7 | 6 | 8 | 8 | 8 | 8 | 5 |
| Use Current | WA | 986 | 68.6 | Nbaca | Nbaca | 3 | 6 | 6 | 4 | 8 | 8 | 8 | 8 | 3 | 5 | 7 | 7 | 5 | 8 | 8 | 8 | 8 | 4 |
| Change | WA | 988 | 20.95 | Nbaca | Ontca | 3 | 6 | 6 | 4 | 8 | 8 | 8 | 8 | 4 | 5 | 7 | 7 | 5 | 8 | 8 | 8 | 8 | 5 |
| Change | WA | 989 | 38.6 | Nbaca | Ontca | 3 | 6 | 6 | 4 | 8 | 8 | 8 | 8 | 4 | 5 | 7 | 7 | 5 | 8 | 8 | 8 | 8 | 5 |
| Change | WA | 990 | 17.6 | Nbaca | Ontca | 3 | 6 | 6 | 4 | 8 | 8 | 8 | 8 | 4 | 5 | 7 | 7 | 5 | 8 | 8 | 8 | 8 | 5 |
| Change | WA | 991 | 8.85 | Nbaca | Ontca | 3 | 6 | 6 | 4 | 8 | 8 | 8 | 8 | 4 | 5 | 7 | 7 | 5 | 8 | 8 | 8 | 8 | 5 |
| Change | WA | 992 | 57.25 | Nbaca | Ontca | 3 | 6 | 6 | 4 | 8 | 8 | 8 | 8 | 4 | 5 | 7 | 7 | 5 | 8 | 8 | 8 | 8 | 5 |
| TNT or Zone | WA | 993 | 34.2 | Nbaca | TNT Avail | 3 | 6 | 6 | 4 | 8 | 8 | 8 | 8 | 4 | 5 | 7 | 7 | 5 | 8 | 8 | 8 | 8 | 4 |
| Change | WA | 994 | 3.85 | Nbaca | Ontca | 3 | 6 | 6 | 4 | 8 | 8 | 8 | 8 | 4 | 5 | 7 | 7 | 5 | 8 | 8 | 8 | 8 | 5 |

SHIPMENT FLOW VALIDATION SYSTEMS AND METHODS

BACKGROUND OF THE INVENTION

Consignors having a significant volume of packages for distribution to a plurality of consignees may utilize direct or drop shipping networks associated with a carrier to distribute the packages to the respective consignees. In a direct shipping network, a consignor, carrier, or a third party logistics provider transports a subset of the consignor's packages (e.g., one or more truckloads) via a direct shipment from a shipping origin of the consignor to a hub facility of the carrier. The subset of packages then enter the carrier's general shipping network at the hub and are delivered by the carrier to the respective consignees associated with the packages. A drop shipping network is similar except that the consignor utilizes a third-party freight or logistics company to transport the consignor's packages from the consignor's shipping origin to the carrier's hub. For the sake of convenience, the term "direct shipping network" is used herein to refer to both direct shipping networks and drop shipping networks.

For example, as shown in FIG. 1, a consignor located in Nashville, Tenn. direct ships a truckload of packages to a carrier's hub in San Diego, Calif., and these packages enter the carrier's general shipping network at the San Diego hub for distribution to the consignees, which are, in this example, located in geographical areas defined by three-digit ZIP codes 974 and 977.

However, carriers and consignors do not have a tool for validating whether the hub selected for the direct shipping network is the optimal hub for the direct shipping network for keeping transportation costs and/or transportation times minimized. In addition, a tool is needed that allows carriers and/or consignors to model alternative distribution flows for selecting an alternative hub that may better suit the needs of each consignor.

BRIEF SUMMARY OF THE INVENTION

The following summary is not an extensive overview and is not intended to identify key or critical elements of the apparatuses, methods, systems, processes, and the like, or to delineate the scope of such elements. This Summary provides a conceptual introduction in a simplified form as a prelude to the more-detailed description that follows.

Embodiments of the present invention provide a tool for validating the current hubs and/or identifying optimal hubs in a direct ship network and are configured to provide one or more of the following advantages: (1) reduce shipping costs, (2) reduce shipping time, and (3) reduce shipping distances.

In various embodiments of the present invention, a system for modeling the distribution flow for a set of packages is provided. The system includes memory and at least one computer processor, and the least one processor is configured to retrieve a current distribution flow model for simulating the transportation flow of a set of packages within a carrier's shipping network from a current distribution hub to a first geographical area. The current distribution flow model indicates at least (1) the current distribution hub to which the set of packages are to be transported from an origin and (2) a current number of days expected for transporting the set of packages from the origin to the first geographical area via the current distribution hub. Additionally, the at least one processor is further configured to generate an alternative distribution flow model for simulating the transportation flow of the set of packages within the carrier's shipping network from an alternative distribution hub to the first geographical area, in which the alternative distribution hub is located remotely from the current distribution hub. The alternative distribution model indicates at least (1) the alternative distribution hub to which the set of packages may be transported from the origin and (2) an alternative number of days expected for transporting the set of packages from the origin to the first geographical area via the alternative distribution hub. Furthermore, the at least one processor is configured to compare the current distribution flow model and the alternative distribution flow model to determine which model indicates a lesser number of days expected to transport the set of packages from the origin to the first geographical area. Moreover, the at least one processor is configured to identify at least one of the models as an optimal distribution flow model associated with the first geographical area based on which model indicates the lesser number of days expected to transport the set of packages from the origin to the first geographical area.

In additional various embodiments, the current distribution flow model further indicates a current zone associated with the current distribution hub and the first geographical area pair, in which the current zone indicates a current distance between the current distribution hub and the first geographical area. Additionally, the alternative distribution flow model further indicates an alternative zone associated with the alternative distribution hub and the first geographical area pair, in which the alternative zone indicates an alternative distance between the alternative distribution hub and the first geographical area. Even more, the at least one processor is further configured to compare the current distribution flow model and the alternative distribution flow model to determine which model indicates a zone indicating a lesser distance between the respective hub and the first geographical area, and identify at least one of the models as an optimal distribution flow model associated with the first geographical area based on which model indicates the zone indicating the lesser distance between the respective hub and the first geographical area.

In other various embodiments, a system for modeling the distribution flow for a set of packages is also provided. The system includes memory and at least one computer processor, and the least one processor is configured to generate a first distribution flow model for simulating the transportation flow of a set of packages within a carrier's shipping network from a first distribution hub to a first geographical area. The first distribution flow model indicates at least (1) the first distribution hub to which the set of packages may be transported from an origin and (2) a first number of days expected for transporting the set of packages from the origin to the first geographical area via the first distribution hub. Also, the at least one processor is configured to generate a second distribution flow model for simulating the transportation flow of the set of packages within the carrier's shipping network from a second distribution hub to the first geographical area, in which the second distribution hub is located remotely from the first distribution hub. The second distribution flow model indicates at least (1) the second distribution hub to which the set of packages may be transported from the origin and (2) a second number of days expected for transporting the set of packages from the origin to the first geographical area via the second distribution hub. In addition, the at least one processor is configured to compare the first distribution flow model and the second distribution flow model to determine which model indicates a least number of days expected to transport the set of packages from the origin to the first geographical area. Furthermore, the at least one processor is configured to identify at least one of the models as an optimal distribution flow model associated with the first geographical area based on which model indicates the least number of days expected to transport the set of packages from the origin to the first geographical area.

In yet other various embodiments, a system for modeling the distribution flow for a set of packages is further provided. The system includes memory and at least one computer processor, and the least one processor is configured to retrieve a current distribution flow model for simulating the transportation flow of a set of packages within a carrier's shipping network from a current distribution hub to a first geographical area. The current distribution flow model indicates at least (1) the current distribution hub to which the set of packages are to be transported from an origin and (2) a current zone associated with the current distribution hub and the first geographical area pair, in which the current zone indicates a current distance between the current distribution hub and the first geographical area. In addition, the processor is further configured to generate an alternative distribution flow model for simulating the transportation flow of the set of packages within the carrier's shipping network from an alternative distribution hub to the first geographical area, in which the alternative distribution hub is located remotely from the current distribution hub. The alternative distribution flow model indicates at least (1) the alternative distribution hub to which the set of packages may be transported from the origin and (2) an alternative zone associated with the alternative distribution hub and the first geographical area pair, in which the alternative zone indicates an alternative distance between the alternative distribution hub and the first geographical area. Furthermore, the at least one processor is configured to compare the current distribution flow model and the alternative distribution flow model to determine which model indicates a zone indicating a lesser distance between the respective hub and the first geographical area. Additionally, the at least one processor is configured to identify at least one of the models as an optimal distribution flow model associated with the first geographical area based on which model indicates the zone indicating the lesser distance between the respective hub and the first geographical area.

In additional various embodiments, the current distribution flow model further indicates a current number of days expected for transporting the set of packages from the origin to the first geographical area via the current distribution hub. Additionally, the alternative distribution flow model further indicates an alternative number of days expected for transporting the set of packages from the origin to the first geographical area via the alternative distribution hub. Even more, the at least one processor is further configured to compare the current distribution flow model and the alternative distribution flow model to determine which model indicates a lesser number of days expected to transport the set of packages from the origin to the first geographical area, and identify at least one of the models as an optimal distribution flow model associated with the first geographical area based on which model indicates the lesser number of days expected to transport the set of packages from the origin to the first geographical area.

In even more various embodiments, a system for modeling the distribution flow for a set of packages is also provided. The system includes memory and at least one computer processor, and the least one processor is configured to generate a first distribution flow model for simulating the transportation flow of a set of packages within a carrier's shipping network from a first distribution hub to a first geographical area. The first distribution flow model indicates at least (1) the first distribution hub to which the set of packages may be transported from an origin and (2) a first zone associated with the first distribution hub and the first geographical area pair, in which the first zone indicates a first distance between the first distribution hub and the first geographical area. Furthermore, the at least one processor is configured to generate a second distribution flow model for simulating the transportation flow of the set of packages within the carrier's shipping network from a second distribution hub to the first geographical area, in which the second distribution hub is located remotely from the first distribution hub. The second distribution flow model indicates at least (1) the second distribution hub to which the packages may be transported from the origin and (2) a second zone associated with the second distribution hub and the first geographical area pair, in which the second zone indicates a second distance between the second distribution hub and the first geographical area. Additionally, the at least one processor is configured to compare the first distribution flow model and the second distribution flow model to determine which model indicates a zone indicating a lesser distance between the respective hub and the first geographical area. Even more, the at least one processor is configured to identify at least one of the models as an optimal distribution flow model associated with the first geographical area based on which model indicates the zone indicating the lesser distance between the respective hub and the first geographical area.

BRIEF DESCRIPTION OF THE DRAWINGS

Figure 1:
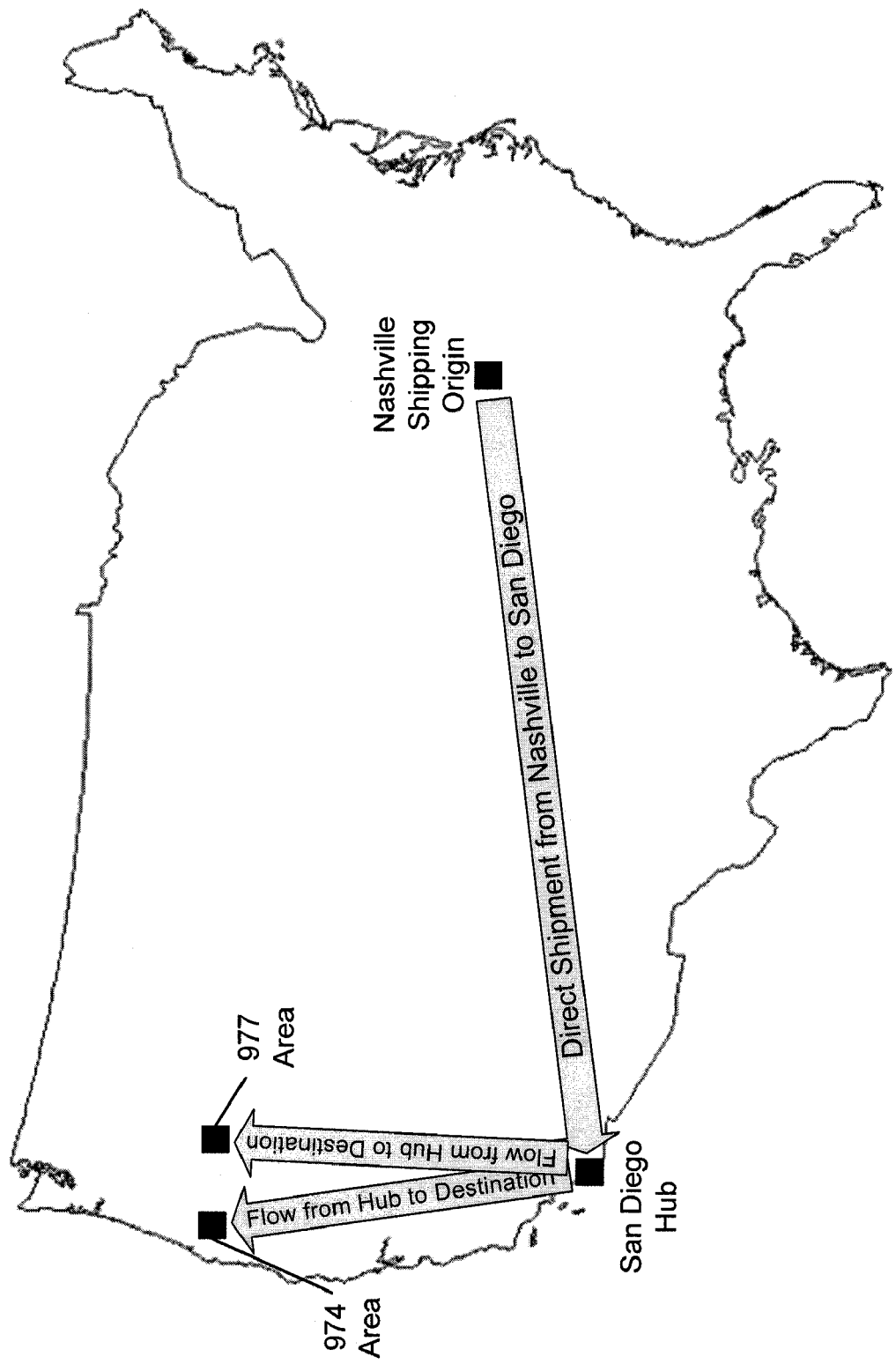

Having thus described various embodiments of the invention in general terms, reference will now be made to the accompanying drawings, which are not necessarily drawn to scale, and wherein:

FIG. 1 illustrates an exemplary direct shipment network.

Figure 2:
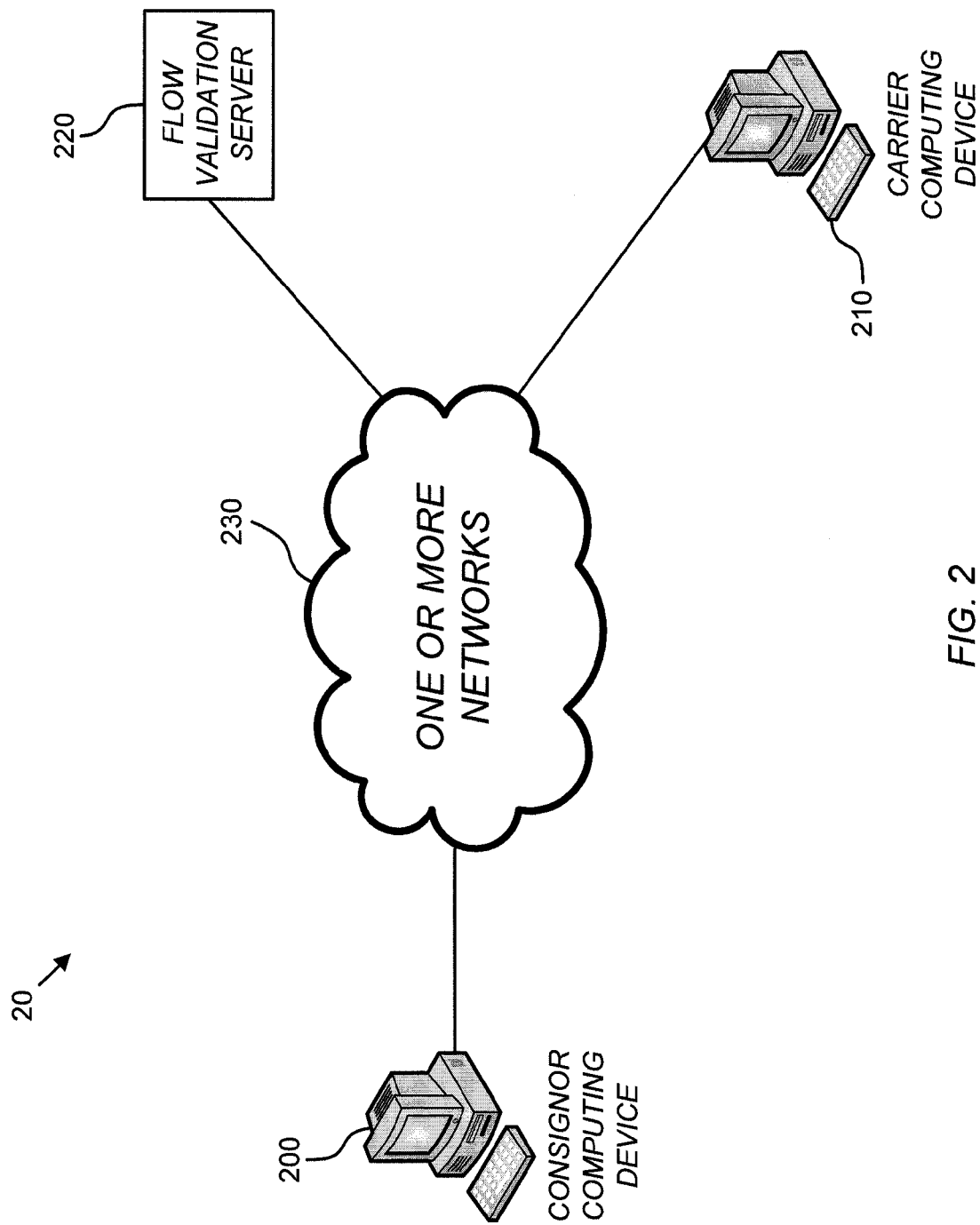

FIG. 2 is a block diagram of a flow validation system according to an embodiment of the present invention.

Figure 3:
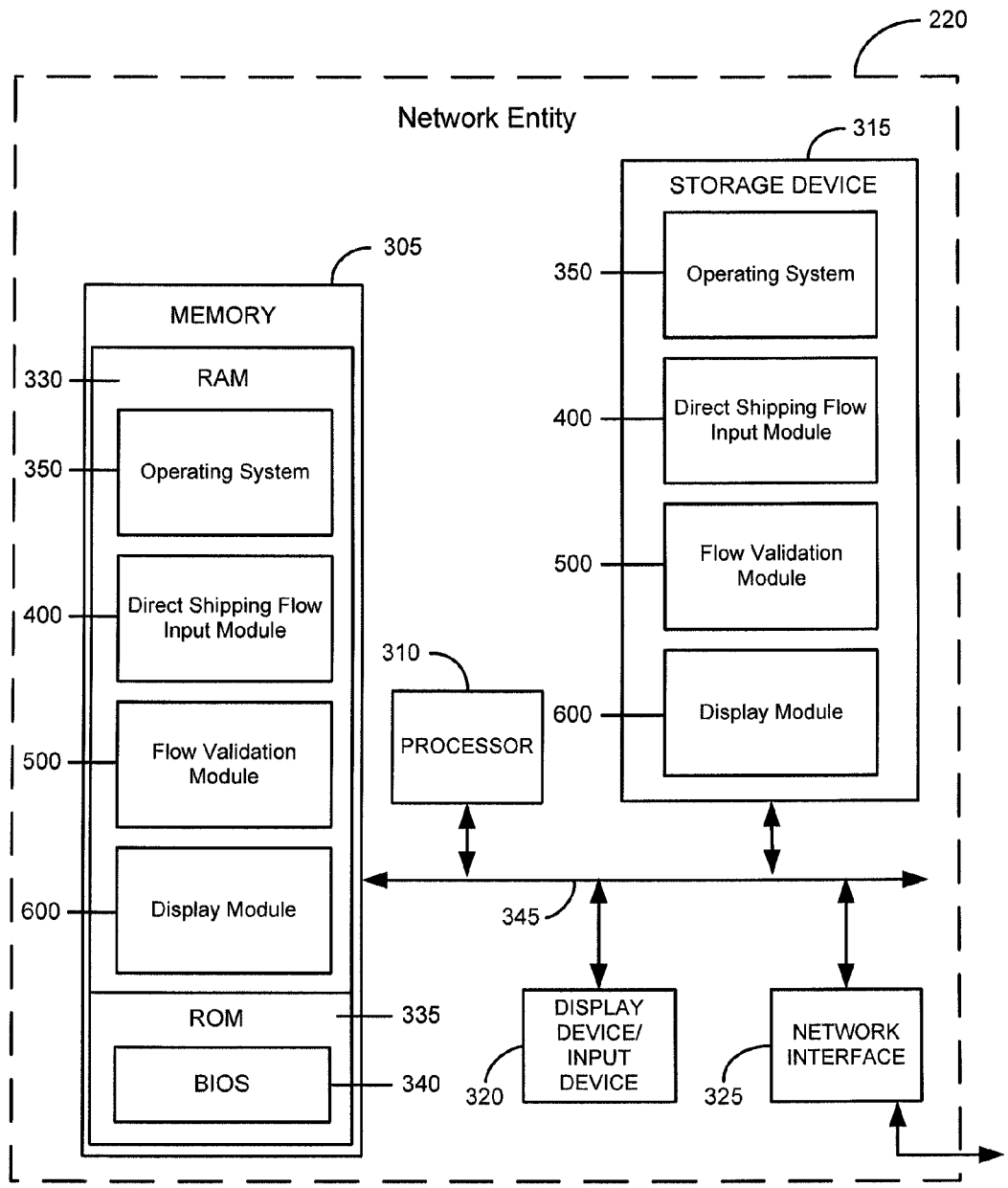

FIG. 3 is a schematic diagram of the flow validation server shown in FIG. 2 according to one embodiment of the present invention.

Figure 4:
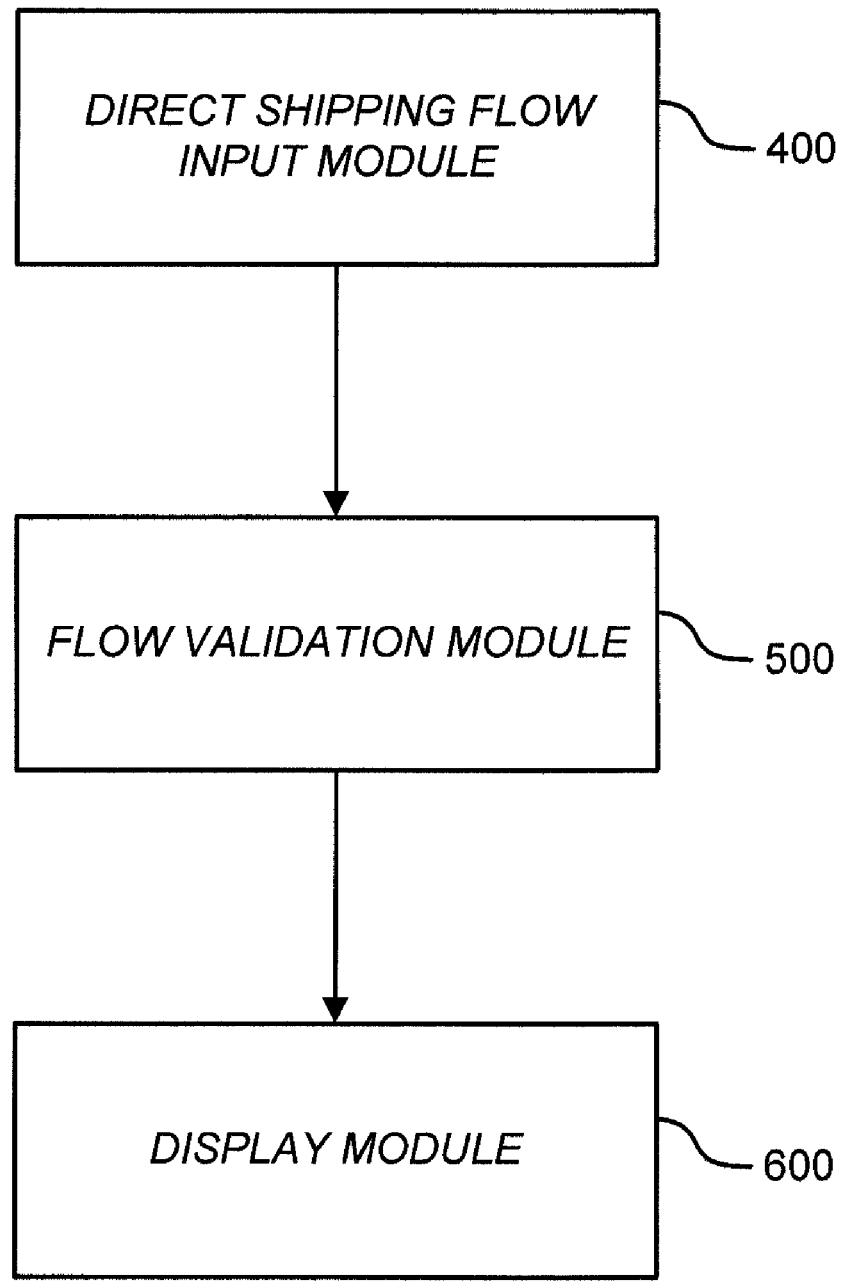

FIG. 4 illustrates an overall process flow for validating a consignor's shipping flows according to an embodiment of the present invention.

Figure 5:
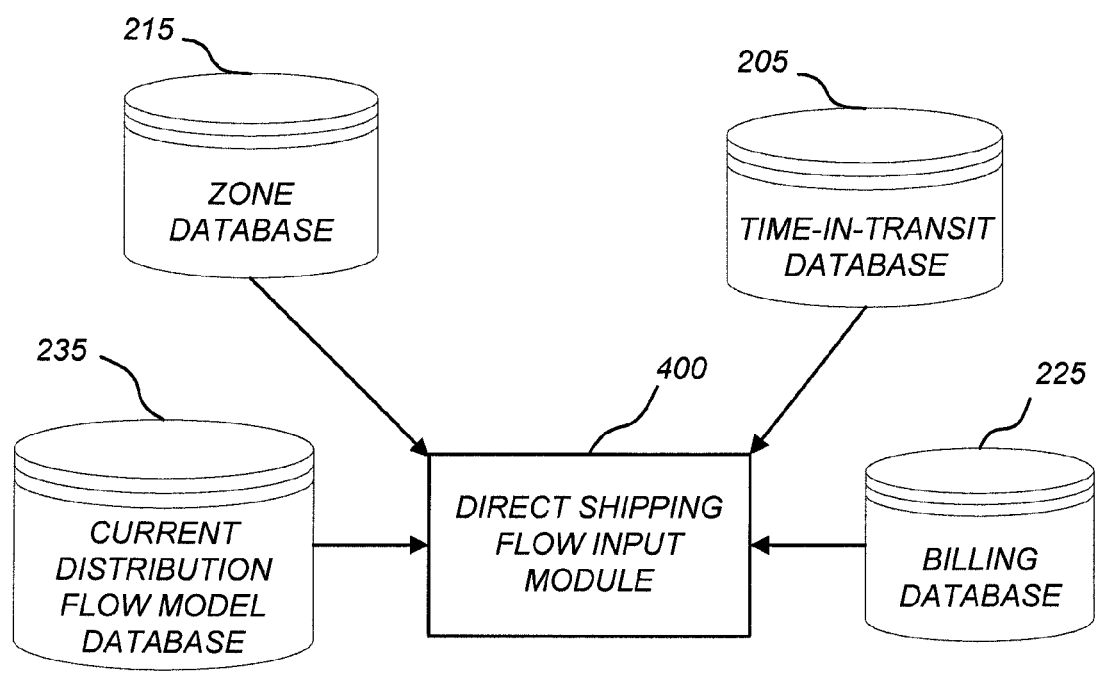

FIG. 5 illustrates a schematic diagram of various databases that are utilized by the system shown in FIG. 2 according to one embodiment of the invention.

Figure 6:
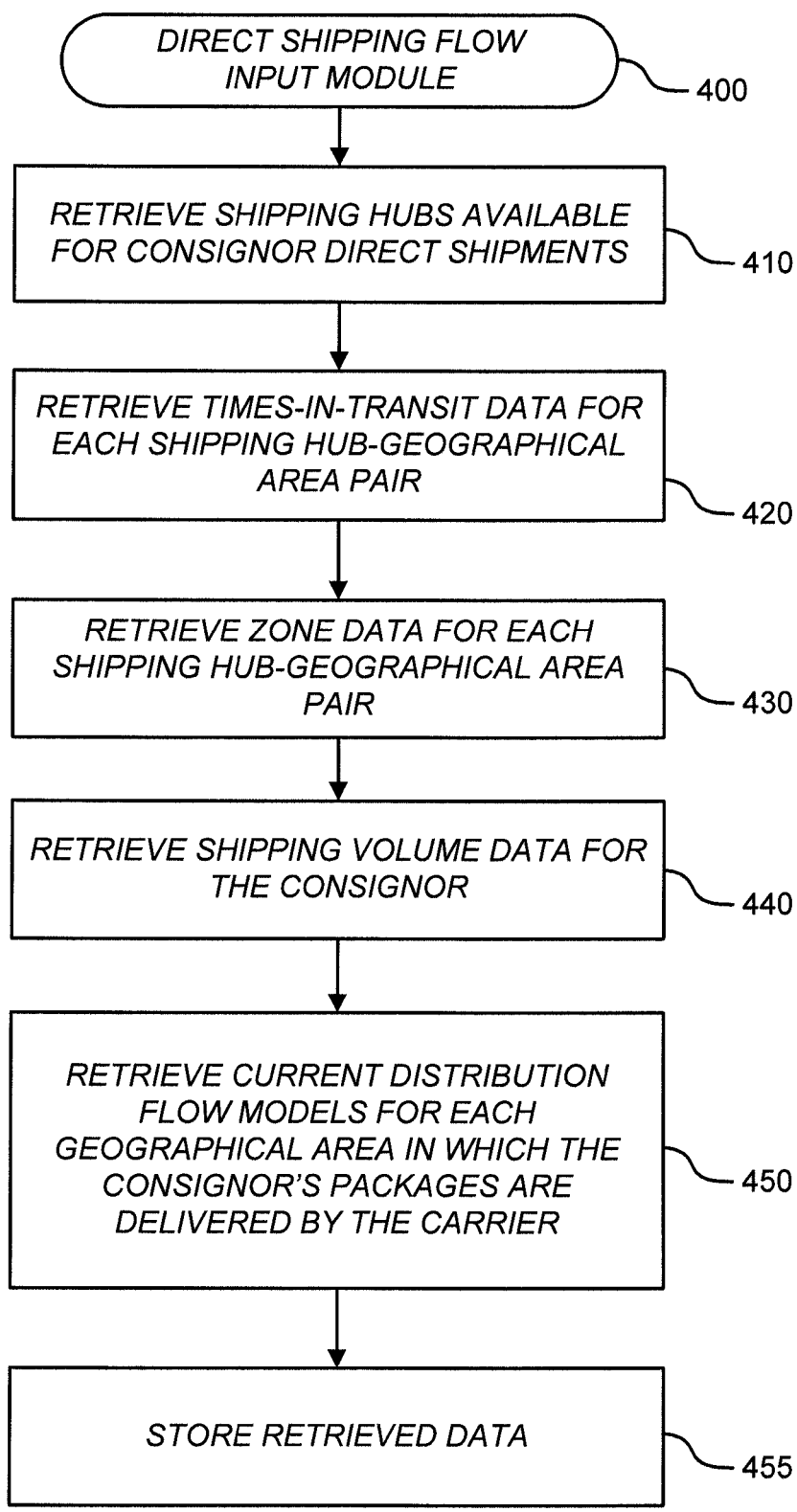

FIG. 6 illustrates a process flow for the direct shipping flow import module shown in FIG. 3 according to an embodiment of the present invention.

Figure 7:
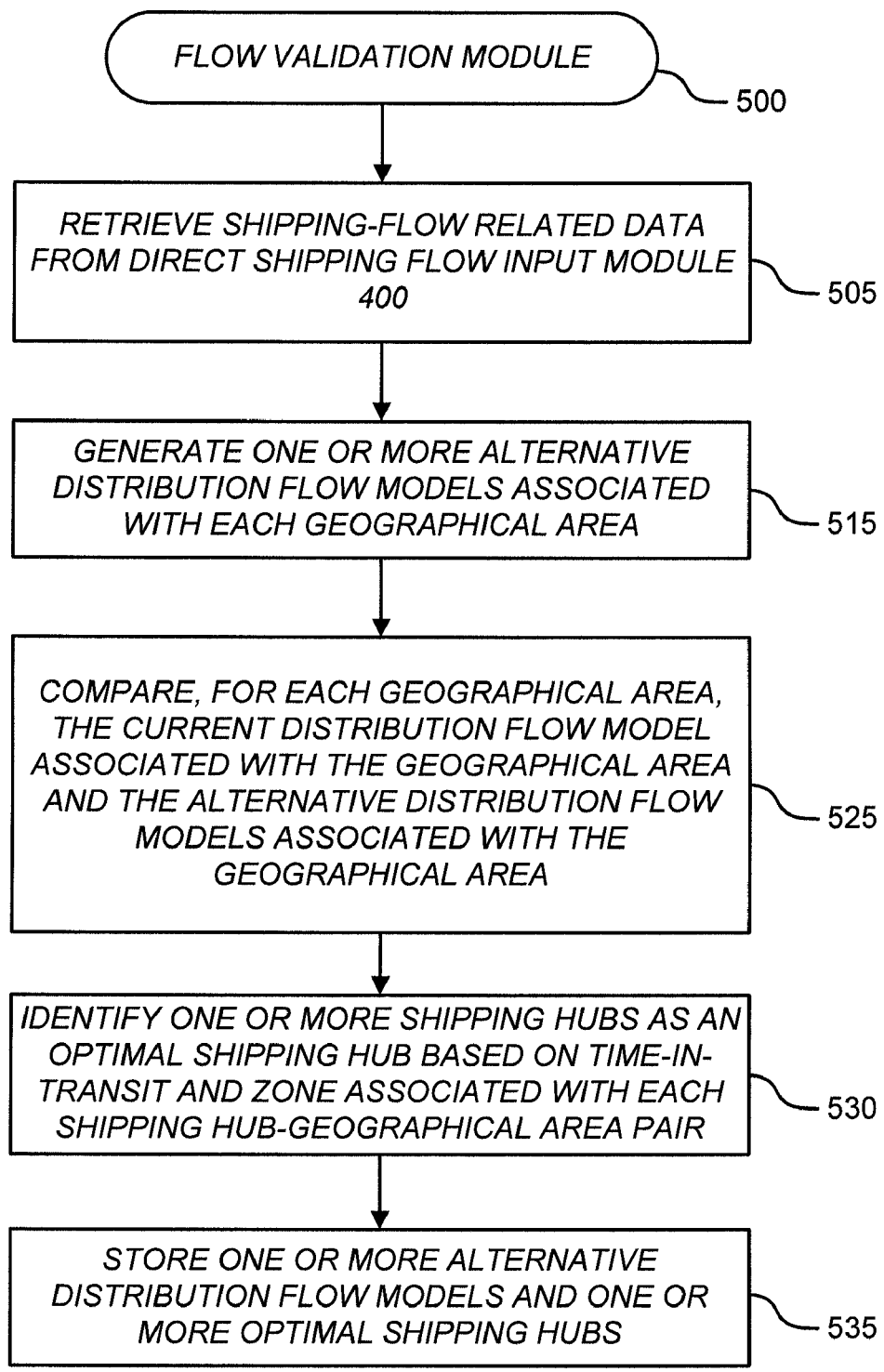

FIG. 7 illustrates a process flow for the flow validation module shown in FIG. 3 according to an embodiment of the present invention.

Figure 8:
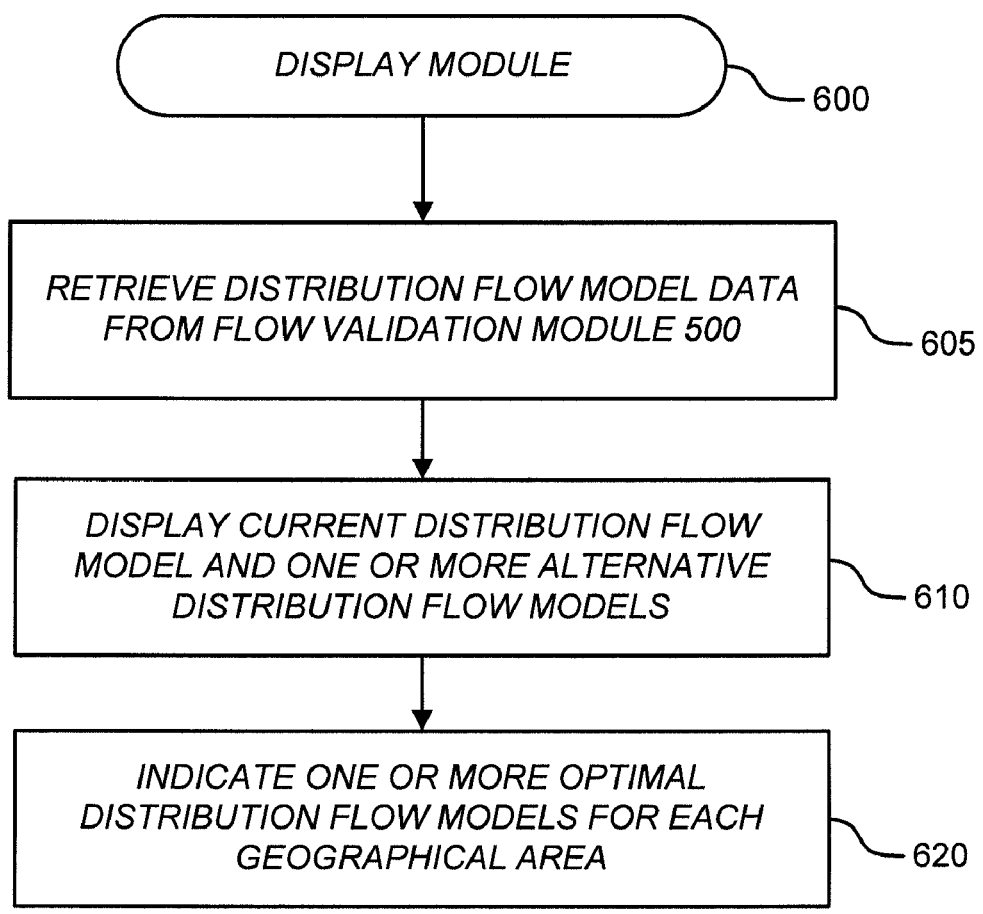

FIG. 8 illustrates a process flow for the display module shown in FIG. 3 according to an embodiment of the present invention.

Figure 9:
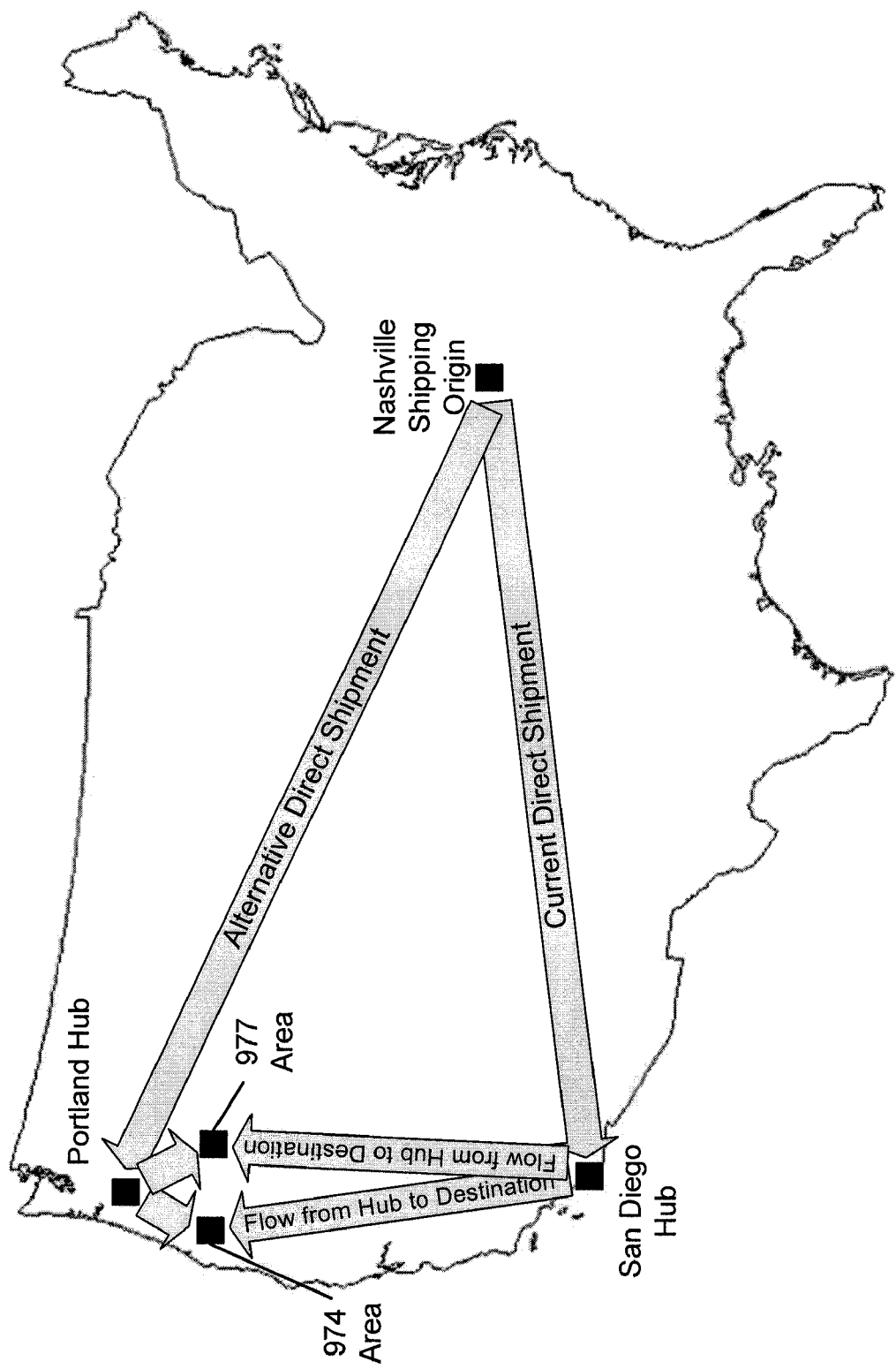

FIG. 9 illustrates the exemplary direct shipping network and distribution flow shown in FIG. 1 and an alternative direct shipping network and distribution flow according to one embodiment.

FIG. 10 is an exemplary display of various flow distribution models for various geographical areas according to an embodiment of the present invention.

DETAILED DESCRIPTION OF VARIOUS EMBODIMENTS OF THE INVENTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Overview

According to various embodiments of the invention, a flow validation system is provided that models distribution flows of a consignor's packages from each of one or more hubs within a carrier's shipping network. The flow validation system allows the carrier and/or the consignor to identify at least one optimal hub from the one or more hubs within the carrier's shipping network to which packages destined for a particular geographical area (e.g., three-digit ZIP code) should be shipped from their origin and from which the packages should be distributed through the carrier's general shipping network to their respective destinations. According to various embodiments, the optimal hub (or hubs) for packages destined for a particular geographical area may be identified based on the number of days expected to transport the packages from the origin to the particular geographical area via the optimal hub (least "time-in-transit") and/or the distance (or range of distances) between the optimal hub and the particular geographical area. In particular, according to various embodiments, the optimal hub identified by the system is the hub that (1) results in the least time-in-transit for each package as compared to the other hubs, which may result in faster delivery by the carrier, and (2) is closer to each destination (or each geographical area that includes each respective destination) of each package as compared to other hubs, which may result in lower transportation costs for the consignor. In other (or further) embodiments, the system may identify a hub as optimal if the hub meets one of these criteria. In addition, according to various embodiments, identifying one or more optimal hubs for packages destined to each geographical area allows the carrier and/or consignor to group sets of packages destined for different geographical areas for direct shipment to a particular optimal hub, which may reduce direct shipment costs for the consignor.

In certain embodiments, the flow validation system compares a current distribution flow model for distributing packages destined for a particular geographical area within the general shipping network of the carrier with one or more alternative distribution flow models generated by the system to identify if one of the alternative distribution flow models better suits the needs of the consignor for the packages destined for the particular geographical area. For example, in one embodiment, the consignor may have a primary interest in reducing the time-in-transit for the packages and a secondary interest in reducing the distance between the distribution hub and the geographical area to which the packages are to be delivered. In such an embodiment, the system retrieves the current distribution flow model and generates one or more alternative distribution flow models to identify which model results in the least time-in-transit for the packages. In certain embodiments, the times-in-transit indicated by each model include the number of days to transport the packages from the respective distribution hub associated with the model to the particular geographical area and the number of days estimated to transport the packages from the consignor's shipping origin to the respective distribution hub.

Similarly, in another embodiment, the consignor may have a primary interest in reducing the distance (or range of distances) between the distribution hub and the particular geographical area (e.g., to reduce shipping costs) and a secondary interest in reducing the time-in-transit for the packages. In such an embodiment, the system retrieves the current distribution flow model and generates one or more alternative distribution flow models to identify which model results in the least distance (or range of distances) between the respective distribution hub associated with each model and the particular geographical area.

According to certain embodiments, the system retrieves "zones" associated with each hub and geographical area pair to compare relative ranges of distances between each hub and each geographical area. For example, according to one embodiment, for a shipping hub located in Roswell, Ga., the geographical areas (e.g., ZIP code, three-digit ZIP code, cities, counties, states) within about 200 miles of the Roswell hub are designated as being in Zone 2 of the Roswell hub, the geographical areas between about 200 miles and 400 miles of the Roswell hub are designated as being in Zone 3 of the Roswell hub, and the geographical areas between about 400 miles and about 600 miles of the Roswell hub are designated as being in Zone 4. Similarly, for another shipping hub in Jacksonville, Fla., the geographical areas within about 200 miles of the Jacksonville hub are designated as being in Zone 2 of the Jacksonville hub, and the geographical areas between about 200 miles and about 400 miles of the Jacksonville hub are designated as being in Zone 3 of the Jacksonville hub. In this example, a particular geographical area located 250 miles from the Roswell hub and 150 miles from the Jacksonville hub is in Zone 3 of the Roswell hub and in Zone 2 of the Jacksonville hub. In a particular embodiment in which the geographical areas are associated with three-digit ZIP codes, each three-digit ZIP code is associated with a particular zone for each respective hub. In alternative embodiments, however, zones are defined by a third party other than the carrier or consignor (e.g., the United States Postal Service).

According to various embodiments, the flow validation system also produces a visual output that displays a matrix showing the various times-in-transit, zones, and/or distances (e.g., a distance or range of distances) between each hub and each geographical area (e.g., three-digit ZIP code) to which the packages are destined for delivery, and in one embodiment, the system also displays a rendering of the distribution flows from each of the one or more hubs.

System Architecture

FIG. 2 is a block diagram of the flow validation system 20 in accordance with an embodiment of the present invention. As represented in this figure, the flow validation system includes various components, including a consignor computing device 200, a carrier computing device 210, a flow validation server 220, and one or more communication networks 230. As can be appreciated by one of ordinary skill in the art, the one or more communication networks 230 facilitate communication between the consignor computing device 200, the carrier computing device 210, and the flow validation server 220. These one or more communication networks 230 may include any of a variety of types of networks that can facilitate voice and/or data transmission, including but not limited to, the Internet, a private intranet, a public switch telephone network (PSTN), or any other type of network known in the art. Additionally, one or more of the components utilized in the flow validation system 20 may be combined with another component in the system 20, and additional or fewer components may be included in the system 20, according to various embodiments of this invention.

FIG. 3 shows a schematic diagram of the flow validation server 220, or similar network entity. As may be understood from FIG. 3, in this embodiment, the flow validation server 220 includes a processor 310 that communicates with other elements within the flow validation server 220 via a system interface or bus 345. The processor 310 could be, for example, a central processing unit, microprocessor, microcontroller, programmable gate array, or some other device that processes data. Also included in the flow validation server 220 is a display device/input device 320 for receiving and displaying data. This display device/input device 320 is, for example, a keyboard, mouse or pointing device that is used in combination with a display device such as a monitor, cathode ray tube (CRT), liquid crystal display (LCD), or other such device. The flow validation server 220 further includes memory 305, which includes both read only memory (ROM) 335 and random access memory (RAM) 330. The server's ROM 335 is used to store a basic input/output system 340 (BIOS) containing the basic routines that help to transfer information between elements within the flow validation server 220.

In addition, the flow validation server 220 includes at least one storage device 315, such as a hard disk drive, a floppy disk drive, a CD-ROM drive, or optical disk drive, for storing information on various computer-readable media, such as a hard disk, a removable magnetic disk, or a CD-ROM disk. As will be appreciated by one of ordinary skill in the art, each of these storage devices 315 is connected to the system bus 345 by an appropriate interface. The storage devices 315 and their associated computer-readable media provide nonvolatile storage for a personal computer. The computer-readable media described above could be replaced by any other type of computer-readable media known in the art. Such media include, for example, magnetic cassettes, flash memory cards, digital video disks, and Bernoulli cartridges.

A number of program modules comprising, for example, one or more computer-readable program code portions executable by the processor 310, are stored by the various storage devices and within RAM 330. Such program modules include an operating system 350, a direct shipping flow input module 400, a flow validation module 500, and a display module 600. The direct shipping flow input module 400, the flow validation module 500, and the display module 600 control certain aspects of the operation of the flow validation server 220 with the assistance of the processor 310 and the operating system 350. For example, as discussed in more detail below in relation to FIG. 6, the direct shipping flow input module 400 retrieves and/or receives information from the carrier computer 210 and/or the consignor computer 200 related to current distribution flow models, distribution hubs available for the consignor's packages, time-in-transit and zone data for each hub-geographical area pair, and package volume for each geographical area. As discussed in more detail below in relation to FIG. 7, the flow validation module 500 receives the information from the direct shipping flow input module 400, generates at least one alternative distribution flow model, and identifies at least one optimal distribution hub for each geographical area. In addition, as discussed in more detail below in relation to FIG. 8, the display module 600 displays to the carrier and/or consignor the various distribution flow models and the identified one or more optimal distribution hubs for each geographical area. In one embodiment, the display module 600 also displays the average daily volume of packages destined to each geographical area, which allows the carrier and/or consignor to identify groups of packages for direct shipment to a particular hub, which may reduce freight costs for transporting the packages from the origin to the particular hub. Although the foregoing describes various embodiments as being software having modules, the software associated with embodiments of the invention need not be modularized and, instead, may be intermingled or written in other non-modularized formats.

Although not shown, according to an embodiment, the storage device 315 and/or memory of the flow validation server 220 may further provide the functions of a carrier data storage device, which may store historical and/or current delivery data and delivery conditions that may be accessed by the flow validation server 220. Also located within the flow validation server 220 is a network interface 325 for interfacing and communicating with other elements of a computer network, such as elements shown in FIG. 2.

According to alternative embodiments (not shown), components of the flow validation server may be located geographically remotely from other components of the flow validation server. In addition, in accordance with other embodiments (not shown), one or more of the components may be combined, and additional or fewer components performing functions described herein may be included in the flow validation server.

Many other alternatives and architectures are possible and can be used to practice various embodiments of the present invention. According to various embodiments, many individual steps of a process may or may not be carried out utilizing the computer systems described herein, and the degree of computer implementation may vary.

Reference is now made to FIGS. 4 and 6-8, which illustrate embodiments of the various modules described above. In particular, FIG. 4 illustrates the overall relationship of the modules 400, 500, 600 of the flow validation server 220, according to various embodiments. The flow validation system 20 begins with the execution of the direct shipping flow input module 400, continues with the execution of the flow validation module 500, and ends with the execution of the display module 600. Steps performed by one embodiment of the direct shipping flow input module 400 are described in relation to FIG. 6, steps performed by one embodiment of the flow validation module 500 are described in relation to FIG. 7, and steps performed by one embodiment of the display module 600 are described in relation to FIG. 8.

As described in more detail below in relation to FIG. 6, the direct shipping flow input module 400, according to various embodiments, retrieves information from one or more databases in communication with the module 400. FIG. 5 illustrates a block diagram of various databases from which the direct shipping flow input module 400 retrieves this information. In particular, in the embodiment shown in FIG. 5, the following databases are provided: a time-in-transit database 205, a zone database 215, a billing database 225, and a current distribution flow model database 235. The embodiment of FIG. 5 shows these databases 205, 215, 225, 235 as being separate databases each associated with different types of data, but in various other embodiments, some or all of the data is stored in the same database.

According to various embodiments, the time-in-transit database 205 stores time-in-transit data. According to various embodiments, the time-in-transit data includes the time expected for a package to be transported from each of the carrier's shipping hubs to each geographical area via the carrier's general shipping network. In a particular embodiment, for each shipping hub-geographical area pair, the time-in-transit data includes the number of days expected to transport a package from the particular shipping hub to the particular geographical area designated in the pair. In certain embodiments, the time-in-transit data further includes the number of days ("line-haul days") expected for transporting a package from the shipping origin to each of the carrier's shipping hubs via a direct shipping (or drop shipping) network. The total number of days expected for transporting the package from the origin to a particular geographical area via each shipping hub may be stored in the time-in-transit database 205 or it may be calculated by the direct shipping flow input module 400 or the flow validation module 500, according to various embodiments. According to various embodiments, the geographical area may be defined by three-digit ZIP code, a city, a ZIP code, a state, a county, a neighborhood, or any other applicable geographical region.

The zone database 215 according to various embodiments stores zone data associated with each hub-geographical area pair. For example, the zone data for a particular shipping hub indicates a distance (or range of distances) between the particular shipping hub and each geographical area. For example, in one embodiment, for a shipping hub located in Roswell, Ga., the geographical areas within about 200 miles of the Roswell hub are designated as being in Zone 2 of the Roswell hub, the geographical areas between about 200 miles and 400 miles of the Roswell hub are designated as being in Zone 3 of the Roswell hub, and the geographical areas between about 400 miles and about 600 miles of the Roswell hub are designated as being in Zone 4. Similarly, for another shipping hub in Jacksonville, Fla., the geographical areas within about 200 miles of the Jacksonville hub are designated as being in Zone 2 of the Jacksonville hub, and the geographical areas between about 200 miles and about 400 miles of the Jacksonville hub are designated as being in Zone 3 of the Jacksonville hub. In this example, a particular geographical area located 250 miles from the Roswell hub and 150 miles from the Jacksonville hub is in Zone 3 of the Roswell hub and in Zone 2 of the Jacksonville hub. In a particular embodiment in which the geographical areas are associated with three-digit ZIP codes, each three-digit ZIP code is associated with a particular zone for each respective shipping hub.

The billing database 225 according to various embodiments stores the carrier's billing data, which includes information related to the packages shipped (and/or to be shipped) by the consignor via the carrier. For example, the billing data includes the shipping volume for the consignor, which is the number of packages shipped from the consignor to various destinations. The shipping volume data may include daily shipping volume for each geographical area, according to one embodiment, and rating information associated with each geographical area to which the packages are shipped (and/or are to be shipped) by the consignor based on the current distribution flow modes associated with each geographical area.

The current distribution flow model database 235 according to various embodiments stores the current distribution hub associated with each geographical area and the time-in-transit data and zone data associated with transporting packages via each distribution hub-geographical area pair indicated in the current distribution flow model.

Exemplary System Operation

As indicated above, various embodiments of the flow validation server 220 execute various modules (e.g., modules 400, 500, 600) to model distribution flows of a consignor's packages from each of one or more hubs within the carrier's shipping network and identify at least one optimal hub to which packages destined for a particular geographical area should be direct (or drop) shipped from their origin and from which the packages should be distributed through the carrier's general shipping network to their respective destinations. According to the embodiment shown in FIG. 4, the flow validation server 220 begins by executing the direct shipping flow input module 400 to retrieve and/or manipulate data related to the shipping process and the consignor's shipping needs, and the flow validation module 500 utilizes the retrieved data to model distribution flows of the consignor's packages and identify at least one optimal hub for each geographical area. The display module 600 is configured for displaying the various distribution flows modeled by the flow validation module 500 and the at least one optimal hub for each geographical area identified by the flow validation module 500.

In general, the direct shipping input module 400 receives various types of information from the carrier and/or the consignor, such as the current distribution flow models associated with each geographical area. The direct shipping flow input module 400 also retrieves various types of information from the carrier, such as the times-in-transit between each shipping hub and geographical area pair, the zone associated with each shipping hub and geographical area pair, and the shipping volume to each geographical area (e.g., average daily volume) by the consignor. In particular, the direct shipping input module 400 executes the steps shown in FIG. 6 according to a particular embodiment of the invention. Beginning with Step 410, the direct shipping flow input module 400 retrieves the shipping hubs that are available for the consignor's direct shipments. In an alternative embodiment (not shown), the module 400 receives the available shipping hubs from user input provided via a user interface of the flow validation system 20.

Next, in Step 420, the direct shipping flow input module 400 retrieves (e.g., from the time-in-transit database 205) time-in-transit data for each shipping hub-geographical area pair. In one embodiment, the time-in-transit data includes time-in-transit data associated with the shipping hubs retrieved in Step 410 and each geographical area to which the carrier delivers (or is expected to deliver) packages for the consignor. As noted above in relation to FIG. 5, according to one embodiment, the time-in-transit data includes the total number of days expected for transporting a package from a particular origin to each geographical area via each shipping hub. However, in various other embodiments, the module 400 is configured to receive as input from the user (or retrieve from the time-in-transit database 205, for example, or other memory of the system 20) the expected number of line-haul days between the consignor's origin and each shipping hub via a direct (or drop) shipping network and to add the number of line-haul days to the retrieved expected number of days for transporting a package from each shipping hub to each geographical area to determine the total time-in-transit associated with each hub-geographical area pair.

Next, in Step 430, the direct shipping flow input module 400 retrieves the zone data (e.g., from the zone database 215) for each shipping hub-geographical area pair. In one embodiment, the zone data includes zone data associated with the shipping hubs retrieved in Step 410 and each geographical area to which the carrier delivers packages for the consignor.

Then, in Step 440, the direct shipping flow input module 400 retrieves shipping volume data (e.g., from the billing database 215) for the consignor. According to various embodiments, the shipping volume data retrieved includes the number of packages shipped by the consignor to each geographical area over a particular time period (e.g., a day, a week, a month, a set number of days). In other embodiments, the module 400 retrieves the total shipping volume over the particular time period and calculates the average volume for the time period.

Next, in Step 450, the direct shipping flow input module 400 retrieves current distribution flow models for each geographical area in which the consignor's packages are delivered by the carrier. The module 400, according to one embodiment, retrieves the current distribution flow models from a current flow model database 235, as shown in FIG. 5.

According to other embodiments, the module 400 receives user input indicating the hubs associated with each geographical area according to the current distribution flow models. According to various embodiments, the direct shipping flow input module 400 then stores the data retrieved in a memory of the flow validation system 20, as shown in Step 455.

In alternative embodiments, the steps performed by the direct shipping flow input module 400 may be performed in different sequences than the sequence described above in relation to FIG. 6. In addition, in various other embodiments, instead of executing the retrieval steps described above, the module 400 may receive user input of the data. Furthermore, in additional embodiments, there may be additional or fewer steps performed by the direct shipping flow input module 400 than shown in FIG. 6.

The flow validation module 500 is generally configured for utilizing the data retrieved by the direct shipping flow input module 400 to model distribution flows of the consignor's packages and identify at least one optimal hub for each geographical area. FIG. 7 illustrates the steps performed by the flow validation module 500 according to one embodiment. Beginning with Step 505, the flow validation module 500 retrieves various shipping flow-related data from the direct shipping flow input module 400, such as, for example, the carrier's shipping hubs available for distributing the consignor's packages, the geographical areas in which the packages are (or are expected to be) delivered, time-in-transit and zone data associated with each shipping hub-geographical area pair, shipping volume for the consignor, and current distribution flow models for the consignor associated with each geographical area. In one embodiment, the flow validation module 500 retrieves this data from the memory to which the direct shipping flow input module 400 stored the data, and in other embodiments, the direct shipping flow input module 400 sends the data to the flow validation module 500.

Next, in Step 515, the flow validation module 500 utilizes at least a portion of the retrieved data to generate one or more alternative distribution flow models associated with each geographical area. In various embodiments, the flow validation module 500 generates an alternative distribution flow model for each shipping hub-geographical area pair. In one embodiment, each alternative distribution flow model indicates at least a particular shipping hub from which a set of packages may be distributed to respective consignees located in the geographical area via the carrier's general shipping network. Each alternative distribution flow model also indicates the time-in-transit data and the zone data associated with the particular shipping hub-geographical area pair. For example, as shown in FIG. 10, the alternative flow distribution models generated by the flow validation module 500 according to one embodiment are displayed in a tabular format showing the time-in-transit data 710 and the zone data 715 associated with each hub-geographical area pair.

In Step 525, the flow validation module 500 compares, for each geographical area, the current distribution flow model associated with the geographical area and the one or more alternative distribution flow models associated with the geographical area. According to one embodiment, this comparison includes comparing the time-in-transit data and zone data associated with each model. However, in other embodiments, the module 500 may compare the time-in-transit data or the zone data, but not necessarily both.

Then, based on the comparison in Step 525, in Step 530, the flow validation module 500 identifies one or more shipping hubs associated with the least times-in-transit for the geographical area and/or the least distance between the geographical area and the shipping hub as optimal shipping hubs. For example, according to various embodiments, for each geographical area, the module 500 identifies one or more shipping hubs associated with the least time-in-transit and the least distance between the shipping hub and the geographical area as an optimal shipping hub. In addition, if there is no shipping hub that is associated with the least time-in-transit and the least distance, the module 500 identifies one or more shipping hubs that are associated with less (or the least) time-in-transit or less (or the least) distance between the hub and the geographical area. According to a particular embodiment, the flow validation module 500 stores the one or more alternative distribution flow models generated by the flow validation module 500 and the identification of the one or more optimal hubs for each geographical area in a memory of the system 20, as shown in Step 535.

According to various embodiments, the display module 600 is configured for displaying to the consignor and/or carrier the current flow distribution model and the one or more alternative flow distribution models and the identified optimal hub(s) for each area. In particular, in the embodiment shown in FIG. 8, the display module 600 retrieves distribution flow model data from the flow validation module 500, as shown in Step 605. Alternatively (not shown), this data may be transmitted to the display module 600 from the flow validation module 500.

Then, in Step 610, the display module 600 displays the current distribution flow model and the one or more alternative distribution flow models via a user interface. In addition, for each geographical area in which packages are expected to be delivered to consignees via the carrier's general shipping network, the display module 600 is configured for displaying the one or more optimal shipping hubs identified in Step 530 of the flow validation module 500, as shown in Step 620. In certain embodiments, such as shown in FIG. 10, the display module 600 displays the various distribution flow models and highlights the optimal shipping hubs for each geographical area identified in Step 530 as optimal hubs based on the time-in-transit and the zone associated with the particular shipping hub-geographical area pair. In a particular embodiment, if the optimal hub identified for a particular geographical area is the current distribution hub, then the display module 600 may utilize a first color to highlight the current distribution hub. If one of the alternative shipping hubs is identified as optimal in Step 530 for each geographical area, then the display module 600 may utilize a second color to highlight the optimal hub. And, if more than one shipping hub is identified as an optimal hub in Step 530 for each geographical area, then the display module 600 may utilize a third color. Furthermore, if one or more shipping hubs are identified as an optimal hub for a particular geographical area based on the time-in-transit or zone, but the same shipping hub is not optimal based on both the time-in-transit and zone, the display module 600 may utilize a fourth color to indicate which shipping hubs are optimal hubs for the particular geographical area based on the time-in-transit or zone.

In addition, according to various embodiments, the display module 600 may be configured to display a schematic diagram or map of distribution flows associated with one or more geographical areas. In one embodiment, the display module 600 is configured to display, for each geographical area, the shipping flows associated with the one or more identified optimal hubs identified in Step 530. In various embodiments, the display module 600 may display the routes on an electronic display, may send the routes to a printer to be printed, or may display the routes in any practical manner that is useable by the consignor and/or carrier.

For example, FIG. 9 illustrates an exemplary display of a current distribution flow model and an alternative direct shipment flow for packages destined to a first geographical area defined by the three-digit ZIP code 974 and a second geographical area defined by the three-digit ZIP code 977. The current distribution flow models indicate that packages destined for these two geographical areas are direct shipped from Nashville (their origin) to the carrier's San Diego hub, and they are distributed to their respective geographical areas from the San Diego hub via the carrier's general shipping network. The alternative distribution flow models indicate that the packages are instead direct shipped from Nashville to the carrier's Portland, Oreg. hub, and they are distributed to their respective geographical areas from the Portland hub via the carrier's general shipping network.

According to various embodiments, the carrier and/or consignor may use at least a portion of the output from the flow validation module 500 and the display module 600 to determine how to group packages together for direct (or drop) shipment to particular distribution hubs. The carrier and/or consignor selects a particular distribution hub identified by the flow validation module 500 as an optimal hub for a certain geographical area (e.g., a geographical area having several packages destined to the area) and then identifies all of the geographical areas for which the selected distribution hub has been identified as an optimal hub. The carrier and/or consignee then determines the total number of packages that would be destined for the selected distribution hub. The total number of packages may be determined, according to one embodiment, by retrieving shipping volume data that includes that the number of packages shipped by the consignor to each geographical area over a particular time period. The number of truckloads required to ship this total number of packages to the selected distribution hub is then determined by the carrier and/or consignee. In addition, the carrier and/or consignee may consider additional factors (e.g., size of the packages, additional amount of handling required by carrier) to determine the feasibility (for the carrier and/or the consignee) for direct shipping the group of packages to the selected distribution hub and/or distributing the packages from the selected distribution hub to their respective consignees. In various embodiments, the determination of how to group packages together for direct shipment is either automated or partially automated.

Additionally, once the carrier and/or consignor have identified groups of packages for direct shipment as described above, the carrier estimates the shipping costs for shipping the group of packages (from origin to the respective destinations, if a direct shipment, or from the distribution hub to the respective destination, if a drop shipment). To estimate the shipping cost for an individual package, in various embodiments, the carrier utilizes shipping rates, the weight of the package, and the zone associated with the distribution hub-geographical area to which the package is destined. In various embodiments, the weight of the package is included in the package level detail data, and in one embodiment, this package level detail data is retrieved from the billing database 225. The carrier then uses the shipping rates, weight, and zone of the package to determine the cost for shipping the package to its destination via direct (or drop) shipment through the respective distribution hub. The carrier repeats this process for each package in the particular group of packages to determine the cost for shipping the particular group of packages. In various embodiments, the determination of the cost of each package is either automated or partially automated.

In embodiments in which the packages are being direct shipped to the distribution hub from the shipping origin, the carrier may include in the estimated costs for each package the costs for shipping the package from the shipping origin to the distribution hub. If the package is included in a truckload that is not full, the carrier may impose additional costs for shipping the package.

In other embodiments, the carrier utilizes the zip code of the distribution hub and the zip code of the geographical area to which a package is destined to determine the zone that is needed for the shipping cost determination. Furthermore, in even other embodiments, the carrier may estimate the cost for shipping a particular group of packages by using the average weight of the packages and the average zone associated with the distribution hub and geographical areas to which the packages are destined. Once the carrier has determined the cost to ship the particular group of packages, the carrier identifies any cost savings associated with the optimal distribution flow in comparison to the current shipping flow.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for modeling distribution flow for a set of packages within a carrier's shipping network, the system comprising memory and at least one computer processor, the at least one computer processor configured for:

retrieving a current distribution flow model for simulating the transportation flow of a set of packages within a carrier's shipping network from a current distribution hub to a first geographical area, based at least in part on a consignor's average package volume for the first geographical area for a specific time period, the current distribution flow model indicating at least: (1) the current distribution hub to which the set of packages are to be transported from an origin and (2) a current number of days expected for transporting the set of packages from the origin to the first geographical area via the current distribution hub;

generating an alternative distribution flow model for simulating the transportation flow of the set of packages within the carrier's shipping network from an alternative distribution hub to the first geographical area, the alternative distribution flow model indicating at least: (1) the alternative distribution hub to which the set of packages may be transported from the origin and (2) an alternative number of days expected for transporting the set of packages from the origin to the first geographical area via the alternative distribution hub, wherein the alternative distribution hub is located remotely from the current distribution hub;

comparing the current distribution flow model and the alternative distribution flow model for the set of packages within the carrier's shipping network to determine which model indicates a lesser number of days expected to transport the set of packages from the origin to the first geographical area; and identifying at least one of the models as an optimal distribution flow model associated with the first geographical area based on which model indicates the lesser number of days expected to transport the set of packages from the origin to the first geographical area.

2. The system of claim 1 wherein:
the current distribution flow model further indicates a current zone associated with the current distribution hub and the first geographical area pair, the current zone indicating a current distance between the current distribution hub and the first geographical area,
the alternative distribution flow model further indicates an alternative zone associated with the alternative distribution hub and the first geographical area pair, the alternative zone indicating an alternative distance between the alternative distribution hub and the first geographical area,
the at least one processor is further configured for:
comparing the current distribution flow model and the alternative distribution flow model to determine which model indicates a zone indicating a lesser distance between the respective hub and the first geographical area, and
identifying at least one of the models as an optimal distribution flow model associated with the first geographical area based on which model indicates the zone indicating the lesser distance between the respective hub and the first geographical area.

3. The system of claim 1 wherein the current distance is a first range of distances and the alternative distance is a second range of distances.

4. The system of claim 1 wherein:
the alternative distribution flow model is a first alternative distribution flow model, the alternative distribution hub is a first alternative distribution hub, and the alternative number of days is a first alternative number of days, and
the at least one computer processor is further configured for:
generating a second alternative distribution flow model for simulating the transportation flow of the set of packages within the carrier's shipping network from a second alternative distribution hub to the first geographical area, the second alternative distribution flow model indicating at least: (1) the second alternative distribution hub to which the set of packages may be transported from the origin and (2) a second alternative number of days expected for transporting the set of packages from the origin to the first geographical area via the second alternative distribution hub, wherein the second alternative distribution hub is located remotely from the current distribution hub and the first alternative distribution hub;
comparing the current distribution flow model, the first alternative distribution flow model, and the second distribution flow model to determine which model indicates a least number of days expected to transport the set of packages from the origin to the first geographical area; and
identifying at least one of the models as an optimal distribution flow model associated with the first geographical area based on which model indicates the least number of days expected to transport the set of packages from the origin to the first geographical area.

5. The system of claim 4 wherein the at least one processor is further configured for causing the at least one identified optimal distribution flow model to be displayed to a user via a user interface.

6. The system of claim 4 wherein:
the set of packages is a first set of packages and the current number of days is a first current number of days,
the current distribution flow model further indicates a second current number of days expected for transporting a second set of packages from a second origin to a second geographical area via the current distribution hub,
the first alternative distribution flow model further indicates a third alternative number of days expected for transporting the second set of packages from the second origin to the second geographical area via the first alternative distribution hub,
the second alternative distribution flow model further indicates a fourth alternative number of days expected for transporting the second set of packages from the second origin to the second geographical area via the second alternative distribution hub, and
the at least one computer processor is further configured for:
comparing the current distribution flow model, the first alternative distribution flow model, and the second alternative distribution flow model to determine which model indicates a least number of days expected to transport the second set of packages from the second origin to the second geographical area; and
identifying at least one of the models as an optimal distribution flow model associated with the second geographical area based on which model indicates the least number of days expected to transport the second set of packages from the second origin to the second geographical area.

7. The system of claim 6 wherein the first geographical area is a first ZIP code and the second geographical area is a second ZIP code, wherein the first and second ZIP codes are geographically remote from each other.

8. The system of claim 6 wherein the first origin and the second origin are the same.

9. The system of claim 6 wherein the first origin and the second origin are geographically remote from each other.

10. The system of claim 6 wherein the at least one computer processor is further configured for:
comparing the at least one identified optimal model associated with the first geographical area with the at least one identified optimal model associated with the second geographical area; and
in response to a particular one of the respective hubs of the at least one identified optimal model associated with the first geographical area being the same as a particular one of the respective hubs of the at least one identified optimal model associated with the second geographical area, assigning the first set of packages and the second set of packages to be distributed from the particular hub.

11. The system of claim 1 wherein the average package volume is an average daily volume of packages.

12. The system of claim 11 wherein the average daily volume is less than one.

13. The system of claim 1 wherein the at least one processor is further configured for causing the at least one identified optimal distribution flow model to be displayed to a user via a user interface.

14. The system of claim 1 wherein:
the set of packages is a first set of packages, the current number of days is a first current number of days, and the alternative number of days is a first alternative number of days;
the current distribution flow model further indicates a second current number of days expected for transporting a second set of packages from a second origin to a second geographical area via the current distribution hub;

the alternative distribution flow model further indicates a second alternative number of days expected for transporting the second set of packages from the second origin to the second geographical area via the alternative distribution hub;

and the at least one computer processor is further configured for:

comparing the current distribution flow model and the alternative distribution flow model to determine which model indicates a least number of days expected to transport the second set of packages from the second origin to the second geographical area; and identifying at least one of the models as an optimal distribution flow model associated with the second geographical area based on which model indicates the least number of days expected to transport the second set of packages from the second origin to the second geographical area.

15. The system of claim 14 wherein:

the current distribution flow model further indicates: (1) a first current zone associated with the current distribution hub and the first geographical area pair, the first current zone indicating a distance between the current distribution hub and the first geographical area, and (2) a second current zone associated with the current distribution hub and the second geographical area pair, the second current zone indicating a current distance between the current distribution hub and the second geographical area;

the alternative distribution flow model further indicates: (1) a first alternative zone associated with the alternative distribution hub and the first geographical area pair, the first alternative zone indicating a distance between the alternative distribution hub and the first geographical area, and (2) a second alternative zone associated with the alternative distribution hub and the second geographical area pair, the second alternative zone indicating an alternative distance between the alternative distribution hub and the second geographical area; and the at least one processor is further configured for:

comparing the current distribution flow model and the alternative distribution flow model to determine which model indicates a zone indicating a lesser distance between the respective hub and the first geographical area, comparing the current distribution flow model and the alternative distribution flow model to determine which model indicates a zone indicating a lesser distance between the respective hub and the second geographical area, identifying at lesser one of the models as an optimal distribution flow model associated with the first geographical area based on which model indicates the zone indicating the lesser distance between the respective hub and the first geographical area, and identifying at least one of the models as an optimal distribution flow model associated with the second geographical area based on which model indicates the zone indicating the least distance between the respective hub and the second geographical area.

16. The system of claim 15 wherein the current distance is a first range of distances and the alternative distance is a second range of distances.

17. A system for modeling distribution flow for a set of packages within a carrier's shipping network, the system comprising memory and at least one computer processor, the at least one computer processor configured for:

generating a first distribution flow model for simulating the transportation flow of a set of packages within a carrier's shipping network from a first distribution hub to a first geographical area, based at least in part on a consignor's average package volume for the first geographical area for a specific time period, the first distribution flow model indicating at least: (1) the first distribution hub to which the set of packages may be transported from an origin and (2) a first number of days expected for transporting the set of packages from the origin to the first geographical area via the first distribution hub;

generating a second distribution flow model for simulating the transportation flow of the set of packages within the carrier's shipping network from a second distribution hub to the first geographical area, the second distribution flow model indicating at least: (1) the second distribution hub to which the set of packages may be transported from the origin and (2) a second number of days expected for transporting the set of packages from the origin to the first geographical area via the second distribution hub, wherein the second distribution hub is located remotely from the first distribution hub;

comparing the first distribution flow model and the second distribution flow model for the set of packages within the carrier's shipping network to determine which model indicates a least number of days expected to transport the set of packages from the origin to the first geographical area; and identifying at least one of the models as an optimal distribution flow model associated with the first geographical area based on which model indicates the least number of days expected to transport the set of packages from the origin to the first geographical.

18. A system for modeling distribution flow for a set of packages within a carrier's shipping network, the system comprising memory and at least one computer processor, the at least one computer processor configured for:

retrieving a current distribution flow model for simulating the transportation flow of a set of packages within a carrier's shipping network from a current distribution hub to a first geographical area, based at least in part on a consignor's average package volume for the first geographical area for a specific time period, the current distribution flow model indicating at least: (1) the current distribution hub to which the set of packages are to be transported from an origin and (2) a current zone associated with the current distribution hub and the first geographical area pair, the current zone indicating a current distance between the current distribution hub and the first geographical area;

generating an alternative distribution flow model for simulating the transportation flow of the set of packages within the carrier's shipping network from an alternative distribution hub to the first geographical area, the alternative distribution flow model indicating at least: (1) the alternative distribution hub to which the set of packages may be transported from the origin and (2) an alternative zone associated with the alternative distribution hub and the first geographical area pair, the alternative zone indicating an alternative distance between the alternative distribution hub and the first geographical area, wherein the alternative distribution hub is located remotely from the current distribution hub;

comparing the current distribution flow model and the alternative distribution flow model for the set of packages within the carrier's shipping network to determine which model indicates a zone indicating a lesser distance between the respective hub and the first geographical area; and identifying at least one of the models as an optimal distribution flow model associated with the first geographical area based on which model indicates the zone indicating the lesser distance between the respective hub and the first geographical area.

19. The system of claim 18 wherein:

the current distribution flow model further indicates a current number of days expected for transporting the set of packages from the origin to the first geographical area via the current distribution hub, the alternative distribution flow model further indicates an alternative number of days expected for transporting the set of packages from the origin to the first geographical area via the alternative distribution hub, wherein the alternative distribution hub is located remotely from the current distribution hub, and the at least one processor is further configured for:

comparing the current distribution flow model and the alternative distribution flow model to determine which model indicates a lesser number of days expected to transport the set of packages from the origin to the first geographical area; and identifying at least one of the models as an optimal distribution flow model associated with the first geographical area based on which model indicates the lesser number of days expected to transport the set of packages from the origin to the first geographical area.

20. The system of claim 18 wherein the current distance is a first range of distances and the alternative distance is a second range of distances.

21. A system for modeling distribution flow for a set of packages within a carrier's shipping network, the system comprising memory and at least one computer processor, the at least one computer processor configured for:

generating a first distribution flow model for simulating the transportation flow of a set of packages within a carrier's shipping network from a first distribution hub to a first geographical area, based at least in part on a consignor's average package volume for the first geographical area for a specific time period, the first distribution flow model indicating at least: (1) the first distribution hub to which the set of packages may be transported from an origin and (2) a first zone associated with the first distribution hub and the first geographical area pair, the first zone indicating a first distance between the first distribution hub and the first geographical area;

generating a second distribution flow model for simulating the transportation flow of the set of packages within the carrier's shipping network from a second distribution hub to the first geographical area, the second distribution flow model indicating at least: (1) the second distribution hub to which the packages may be transported from the origin and (2) a second zone associated with the second distribution hub and the first geographical area pair, the second zone indicating a second distance between the second distribution hub and the first geographical area, wherein the second distribution hub is located remotely from the first distribution hub;

comparing the first distribution flow model and the second distribution flow model for the set of packages within the carrier's shipping network to determine which model indicates a zone indicating a lesser distance between the respective hub and the first geographical area; and identifying at least one of the models as an optimal distribution flow model associated with the first geographical area based on which model indicates the zone indicating the lesser distance between the respective hub and the first geographical area.

22. The system of claim 21 wherein the first distance is a first range of distances and the second distance is a second range of distances.

* * * * *